E. H. WERZNER.
STEAM TURBINE VALVE.
APPLICATION FILED APR. 17, 1917.
1,241,316.
Patented Sept. 25, 1917.
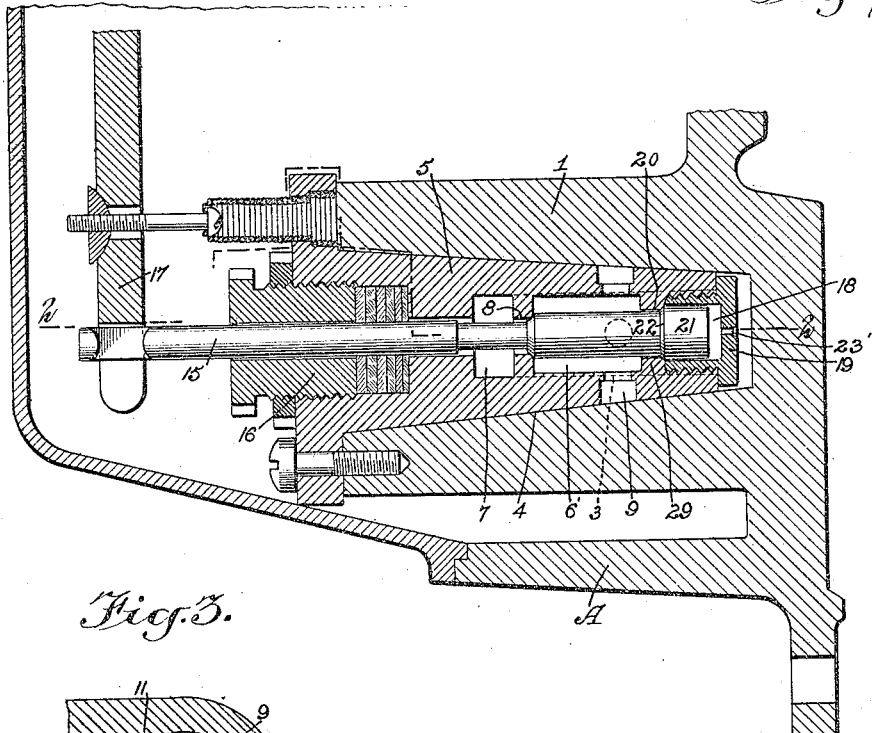
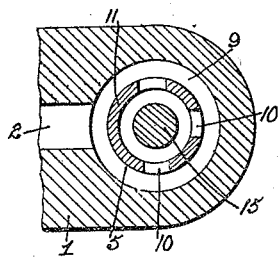
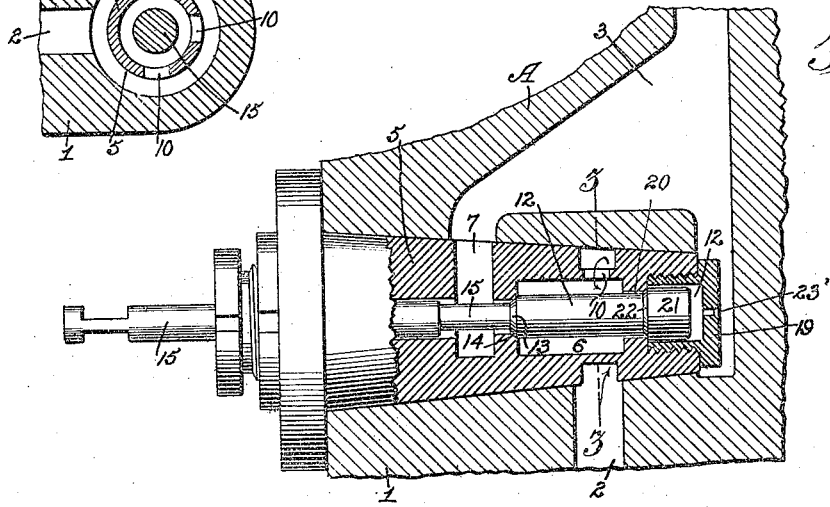
WITNESSES
INVENTOR
E.H. Werzner
BY
ATTORNEYS

UNITED STATES PATENT OFFICE.

EDWARD H. WERZNER, OF EVANSVILLE, INDIANA, ASSIGNOR TO SCHROEDER HEADLIGHT CO., INC., OF EVANSVILLE, INDIANA, A CORPORATION OF INDIANA.

STEAM-TURBINE VALVE.

1,241,316.  Specification of Letters Patent.  Patented Sept. 25, 1917.

Application filed April 17, 1917. Serial No. 162,657.

*To all whom it may concern:*

Be it known that I, EDWARD H. WERZNER, a citizen of the United States, and a resident of Evansville, in the county of Vanderburg and State of Indiana, have invented a new and Improved Steam-Turbine Valve, of which the following is a full, clear, and exact description.

This invention relates to the inlet valve of a turbine, and the invention has for its general objects to provide a valve which is reliable and efficient in use and so designed that it will be extremely sensitive to the action of the governor.

A more specific object of the invention is to provide a novel form of balanced valve whereby it can be easily moved by a centrifugal speed device or governor, so that fluctuation in speeds will be minimized.

With such objects in view, and others which will appear as the description proceeds, the invention comprises various novel features of construction and arrangement of parts which will be set forth with particularity in the following description and claims appended hereto.

In the accompanying drawing, which illustrates one embodiment of the invention and wherein similar characters of reference indicate corresponding parts in all the views, Figure 1 is a longitudinal section of the valve mechanism taken on the axial plane of the valve;

Fig. 2 is a sectional view on the line 2—2, Fig. 1; and

Fig. 3 is a transverse section on the line 3—3, Fig. 2.

Referring to the drawing, A designates the frame of the turbine which has a portion 1 that forms the housing for the valve, such portion 1 being provided with a supply passage 2, Fig. 2, and a delivery passage 3 that conducts the steam to the turbine nozzle. In the portion or walls 1 is a tapering hole 4 in which is fitted the conical casing or valve body 5. This valve body 5 has cored therein chambers 6 and 7 connected by a port 8 through which steam passes from the chamber 6 to the chamber 7. Surrounding the valve body is an annular groove 9 which communicates with the inlet passage 2, and the wall of the valve body at the groove 9 is provided with a plurality of ports 10 through which the steam passes to the chamber 6. The valve body has a solid portion 11 directly in line with the inlet passage 2, as shown in Fig. 3, so that the incoming steam flows in the groove 9 in opposite directions around the valve body to enter the ports 10. The chamber 7 communicates with the passage 3 for conducting the main supply of steam to the turbine. In the body 5 is a valve 12 which has a conical shoulder 13 that is adapted to coöperate with the seat 14 to control the amount of steam flowing to the turbine. The valve 12 is connected with a stem 15 which passes axially through the body 5, there being a stuffing box 16 for preventing leakage of steam around the valve stem. The outer end of the valve stem is connected with a governor lever 17 whereby the valve is reciprocated.

At the inner end of the valve body 5 is a piston chamber 18 formed by a chambered plug 19 screwed into the body 5. The said body has a short passage 20 whereby the chamber 6 communicates with the chamber 18, and in the chamber 18 is a piston 21 which is formed with a conical shoulder 22 adapted to bear on the seat 23 at one end of the passage 20. The diameters of the valve 12 and of the piston 21 are slightly less than the diameters of the passages 20 and chamber 18, respectively, so that a restricted conduit will be formed when the shoulder 22 is off the seat 23 for the flow of steam into the chamber 18, whereby a pressure will be exerted on the piston 21 to counterbalance the pressure of the steam on the conical shoulder 22 of the valve. The plug 19 has a restricted aperture 23′ which allows the balancing steam to escape into the passage 3, as clearly shown in Fig. 2. As soon as the valve is thus balanced it can move freely and is sensitive to the slightest motions of the governor lever 17.

From the foregoing description taken in connection with the accompanying drawing, the advantages of the construction and method of operation will be readily understood by those skilled in the art to which the invention appertains, and while I have described the principle of operation, together with the device which I now consider to be the best embodiment thereof, I desire to have it understood that the device shown is merely illustrative and that such changes may be made when desired as fall within the scope of the appended claims.

Having thus described my invention, I claim as new and desire to secure by Letters Patent:

1. A turbine structure including an inlet passage for the fluid and a delivery passage for conducting the fluid to a nozzle, and a valve device between the passages, said device comprising a body having connected chambers, the passage surrounding the body and communicating with the inlet passage, ports between the surrounding passage and one of the chambers, a valve in the body for controlling communication between the chambers, a third chamber having a restricted communication with the delivery passage, a piston connected with the valve and disposed in and spaced from the walls of the last-mentioned chamber, and a seat with which the piston coöperates to control the flow of fluid into the piston chamber to act on the piston and balance the pressure on the valve.

2. A valve device comprising a structure formed with a tapering hole and having an inlet passage and a delivery passage, a tapering body disposed in said hole and formed with an intermediate chamber and two outer chambers, one of the outer chambers having a free communication with the delivery passage and the other a restricted communication, means connecting the inlet passage with the intermediate chamber, ported walls between the intermediate and outer chambers and having seats, a valve in the intermediate chamber and formed with a shoulder to engage one of the seats, a piston connected with the valve and disposed in and spaced from the walls of the chamber having a restricted communication with the delivery passage, the piston being formed with a shoulder to engage the other valve seat, a stem connected with the valve and passing through the chamber having the free communication with the delivery passage and extending out of the body, and a governor-actuated device connected with the valve stem, said intermediate chamber having restricted communication with the piston chamber to admit fluid into the latter for acting on the piston to balance the fluid pressure on the valve.

3. A valve device of the class described comprising a structure formed with a chamber and an inlet passage and a delivery passage, a body fitted in the said chamber and formed with a chamber in communication with the inlet passage and another chamber having free communication with the delivery passage, a ported wall between said chambers and formed with a valve seat, a valve in the first-named chamber and adapted to engage the said seat, a stem connected with the valve and extending axially through the body, a chambered plug in the body, a ported wall between the chamber of the plug and the first-named chamber, and a piston in the chambered plug and of such size as to permit a limited amount of fluid to enter the chambered plug when the valve is open, said plug having a restricted port whereby the chamber of the plug communicates with the delivery passage, said plug being removable to permit the valve and piston and stem to be removed from said body.

EDWARD H. WERZNER.

Copies of this patent may be obtained for five cents each, by addressing the "Commissioner of Patents, Washington, D. C."